Nov. 10, 1953  W. V. THELANDER  2,658,598
FRICTION CLUTCH PLATE
Original Filed March 11, 1949  2 Sheets-Sheet 2

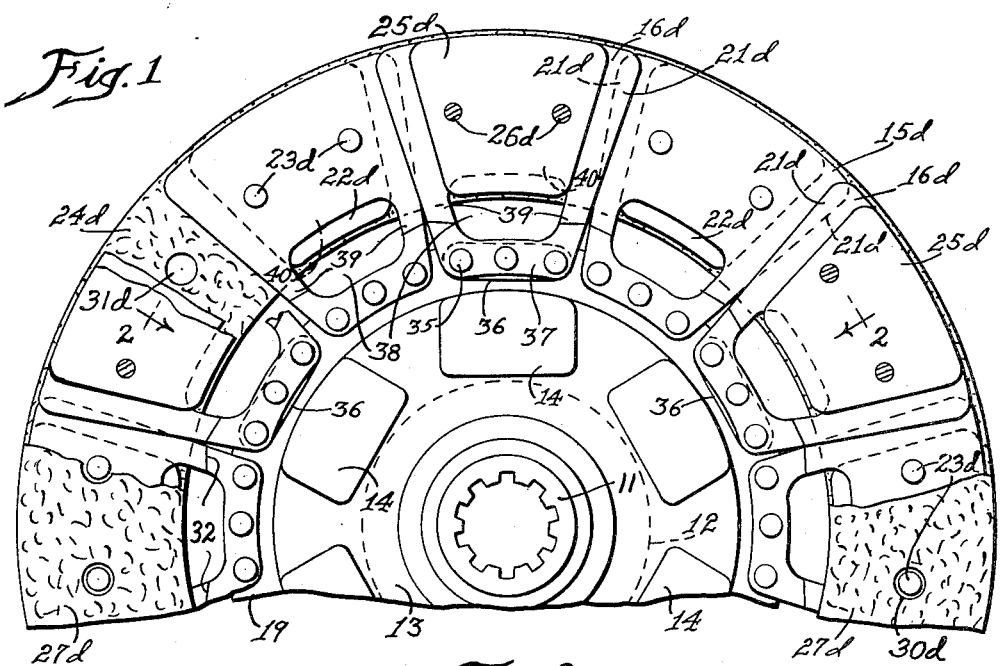
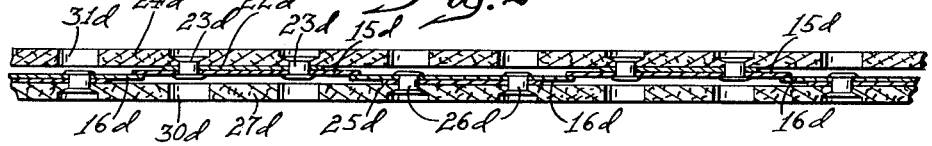
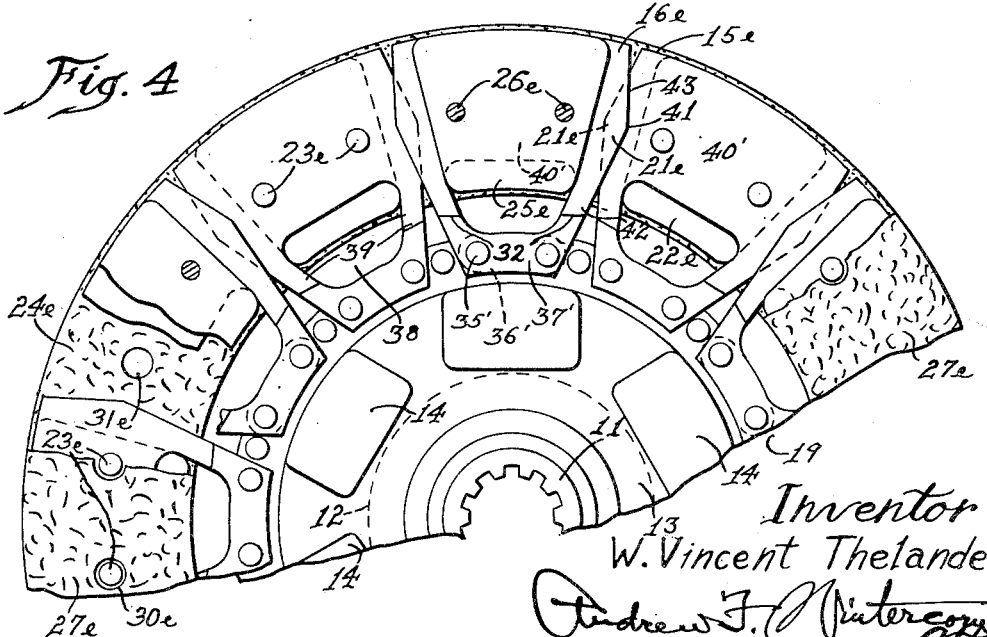

Inventor
W. Vincent Thelander
Atty

Patented Nov. 10, 1953

2,658,598

UNITED STATES PATENT OFFICE 2,658,598

FRICTION CLUTCH PLATE

W. Vincent Thelander, Auburn, Ind., assignor to Dana Corporation, Toledo, Ohio, a corporation of Virginia Original application March 11, 1949, Serial No. 80,855. Divided and this application April 11, 1950, Serial No. 155,272

18 Claims. (Cl. 192—107)

This application is a division of my copending application, Serial No. 80,855, filed March 11, 1949, now Patent 2,524,146, issued October 3, 1950.

This invention relates to improvements in friction clutch plates, and is more particularly concerned with the so-called "mush" construction used in cushion type clutch plates, namely, the peripheral cushion portion of the plates on which the friction facing material is carried with freedom for the opposed facings to yield under a predetermined resistance for smoother clutch engagement and freedom from grabbing and chattering.

Engineers concerned with the design and construction of cushion type clutch plates have always in the testing of such clutch plates for performance taken special note of the build-up or packing rate of the plates, and are generally in agreement that an ideal mush construction is one in which the build-up rate is substantially uniform, because of the smoothness of power take-up and comparative freedom from slippage going with it. It is, therefore, one of the principal objects of my invention to provide a cushion type clutch plate so designed and constructed as to meet that requirement more closely.

Engineers concerned with cushion type clutch plates also are greatly interested in the testing of such plates for wear, to see whether the wear is uniformly distributed on the facings or is confined too much to the inner or outer diameter. The abbreviations for inner diameter and outer diameter are I. D. and O. D. respectively. With mush constructions using bowed leaf springs flattenable in the packing operation, it was always hard to get around this difficulty, because it is virtually impossible to obtain close uniformity in quantity production of such springs. It is, therefore, another important object of my invention to provide a mush construction in which the yieldable spring cushion segments forming the facing supporting portion of the plate are, first of all, flat to obtain the desired uniformity in characteristics in quantity production and at low cost, and are, furthermore, designed to operate with a greater or lesser extent—as to width—of overlap of adjoining edge portions adapted to be flexed for the cushioning action, the overlap, for example, being increased at the O. D. if the wear pattern on the facings indicates the need for distributing more of the wear in that direction, or decreased at the I. D. if the wear pattern indicates too much wear is concentrated there. My invention also enables concentrating clutch engaging pressure on a given diameter, as, for example, midway between the O. D. and I. D., or nearer the I. D. or O. D., accordingly as wear patterns produced on the plates in tests might indicate the necessity. It is also contemplated in certain constructions to "tailor" the plate segments in another way to obtain desired characteristics, namely, by punching openings in the inner end portions of a size and shape to reduce stiffness and consequent resistance to deflection and, accordingly, decrease facing pressure and wear.

The clutch plates of my invention are further improved by making the entire cushion segments, with the exception only of the spacers carried on the outer end portions under the facings, or spring material, with a view to the cushioning portion of the plate having the desired spring-back in the cushioning action and to avoid its taking a set as a result of an overheating, if that should ever occur. Incidental to the overlapping of adjoining edge portions of the cushioning segments, I prefer to crimp the segments transversely near their inner attaching end portoins, the segments of one set being crimped in one direction and those of the other set being crimped in the opposite direction, so that the overlapped edge portions are pressed tightly together in coplanar relationship, thereby insuring a true-running plate of uniform thickness throughout the cushioning portion.

A further feature is the provision of overlapping edge portions of different radial extent, that is, extending to a greater or lesser distance from the I. D. to the O. D., or vice versa, depending on where the engagement pressure on the facings is to be increased or decreased, as indicated by wear pattern tests. Also, the feature of interlocking the overlapping edge portions by reversely overlapped edge portions to hold the other overlapped edge portions in close contact when the plate is turning free.

The invention is illustrated in the accompanying drawings, in which—

Fig. 1 is a rear view of a clutch plate made in accordance with my invention, the lower portion of the plate being broken away to conserve space, and a portion of one friction facing ring being removed to better illustrate the mush construction;

Fig. 2 is a section on the arcuate line 2—2 of Fig. 1;

Fig. 4 is a view similar to Fig. 1, showing cushion segments of another design.

Similar reference numerals are applied to corresponding parts in these views.

Figure 3:
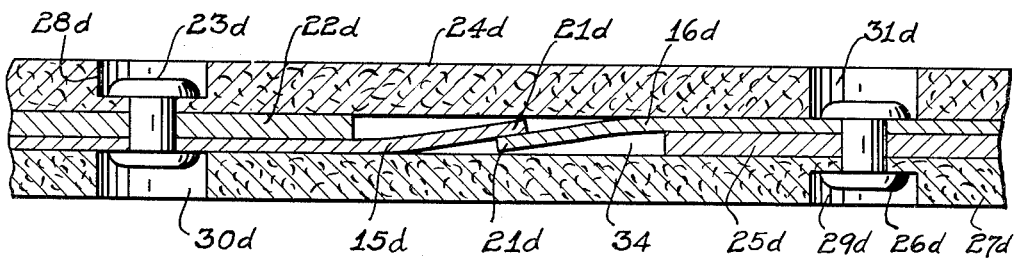
Fig. 3 is an enlargement of a portion of Fig. 2, illustrating the spring cushioning action by showing the facings pressed together as in the engaged condition of the clutch.

Referring first to Figs. 1 to 3, the clutch plate shown comprises relatively rotatable inner and outer portions, the inner portion being formed by a center hub 11 splined for driving connection with the driving shaft of an automotive transmission and provided with an annular flange 12 onto which a notched plate is riveted for oscillatory movement with the hub relative to the housing plates 13, in which pockets 14 are formed containing spring cushioning assemblies, so that when the relative movement occurs between the hub 11 and housing plates 13, the springs of said assemblies are compressed lengthwise to cushion the drive and absorb vibrations, as well known in this art.

The outer portion of the plate contains the mush construction with which my invention is particularly concerned. There are two series of stamped spring steel cushion segments 15d and 16d, all of keystone or segmental shape, the segments 16d being riveted, as at 35, to the rim portion 19 of the housing plates 13 with spacers 36 placed under the attaching portions 37. The spacers 36 are of the same thickness as the segments 15d and 16d and, therefore, serve to dispose the segments 16d in a plane parallel to the plane of the segments 15d but abutting said segments at the overlapping edge portions 21d. Openings 38 of generally rectangular form are provided in the inner end portions of the segments so as to define easily flexible supporting legs 39 extending substantially radially inwardly from the opposed lateral edge portions of the main body portion 40 of each segment. The body portions 40 are of generally rectangular form elongated in a circumferential direction with respect to the plate. Stamped sheet metal spacers 22d of segmental form are riveted with the friction facing ring 24d to the segments 15d, as indicated at 23d. Likewise, other stamped sheet metal segments 25d are riveted to the segments 16d with the other friction facing ring 27d, as shown at 26d. Holes 30d in facing ring 27d provide operating clearance for the heads of rivets 23d, and other holes 31d in facing ring 24d provide operating clearance for the heads of rivets 26d. The riveting at 35 of the inner ends of the segments 16d I found gives rise to a tendency for the body portions of the segments 15d and 16d to stand in divergent relationship to some extent, and it is with a view to avoiding that tendency that I may, as disclosed in the parent application, provide a crimp 32 intermediate the ends of the legs 39 transversely thereof, so as to make the attaching portions 37 lie in a plane in acute angle relationship to the plane of the main body portion of the segments, the crimping on the one set 15d being in one direction and the crimping on the other set 16d being in the opposite direction, so that the overlapped edge portions 21d are pressed tightly together in coplanar relationship, insuring a true-running plate of uniform thickness throughout the cushioning portion.

In operation, it should be clear that when the pressure plate is moved toward the flywheel in the engagement of the clutch, the facings 24d and 27d are pressed together, thereby flexing the segments 15d and 16d in the spaces 34 between the shims 22d and 25d. The build-up rate is substantially uniform in the packing together of the parts in the engagement of the clutch, due to the fact that the segments 15d and 16d constitute separate leaf springs adapted to be flexed by one another and overlap to such a small extent at their edge portions 21d that there can be only a simple flexing or springboard action of the edge portion of each segment. As a result, there is greater smoothness of power take-up and comparative freedom from slippage with this mush construction. The thickness of the shims or spacers 22d and 25d determines the extent to which the overlapped portions of the segments 15d and 16d will be flexed, and, if desired, these spacers 22d and 25d may be increased in thickness or decreased in thickness to increase or decrease the ultimate cushioning pressure. The fact that the entire cushion segments 15d and 16d are of spring material insures good spring-back throughout the circumference of the cushioning portion of the plate every time the clutch is disengaged, and avoids likelihood of the plate taking a set as a result of an overheating, if that should occur. The segments 15d and 16d being flat, can be produced at low cost in quantity production to the desired uniformity so far as spring characteristics are concerned, and that, of course, makes for uniform thickness of the cushioning portion and uniform wear on the facings. The interchangeability of the segments 15d and 16d is of advantage not only in reduced die costs but also speedier assembling. It should be evident that with the present construction the greatest resistance to compression of the cushion portion of the plate is exerted near the O. D., due to the gradually increasing width of overlapping of the edge portions 21d radially outwardly. Obviously, if the width of overlap measured circumferentially of the plate is not great enough to result in enough wear occurring on the facing rings 24d and 27d at the O. D., that can be remedied easily by increasing the included angle of the segments 15d and 16d to provide a proportionately increased width of overlap at the edge portions 21d, and vice versa.

In the construction shown in Fig. 4, segments 15e and 16e are of generally similar form to the segments 15d and 16d, and have stamped sheet metal spacers 22e and 25e cooperating therewith, similarly as spacers 22d and 25d, and segments 16e are mounted on the rim portion 19 of the housing plates 13 with spacers 36' under the attaching portions 37', for a similar reason. However in this construction, the segments 15e and 16e both have an outwardly diverging form to the points 41, as at 42, the points 41 lying on an arc concentric with the hub 11 and of a radius to extend through an intermediate portion of the main body portion 40' of each of the segments, the segments having a substantially uniform width radially outwardly from the points 41, as shown at 43. As a result, there are diamond-shaped areas overlapped by the edge portions 21e of neighboring segments to give the cushioning action when the cushioning portion of the plate is compressed in the engagement of the clutch, and these diamond-shaped areas, lying on the mean radius of the facing rings 24e and 27e will serve to concentrate the wear substantially on the mean radius, but, obviously, one may move the points 41 radially outwardly or inwardly in a redesign of the segments 15e and 16e to shift the pressure accordingly and cause more wear to occur nearer the O. D. or nearer the I. D., as tests may indicate the advisability, the aim being, of course, to secure as nearly uniform wear on the facings as possible.

Figure 5:
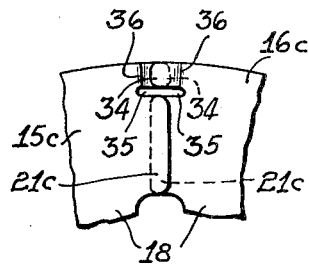
Fig. 5 is a fragmentary face view of segments similar to those of Fig. 1, but formed differently at the overlapping edge portions to obtain a different result.

If tests show that the wear on the facings 24 and 27 is not distributed uniformly but is confined too much to the outer diameter or "O. D." I may, as shown in Fig. 5, vary the spring pressure obtainable by varying the radial length of the overlapping edge portions, the scallops or lugs 21c formed on the edge portions of segments 15c and 16c being of a radial length reaching from the I. D. more or less to the O. D. to obtain as much or as little pressure at the O. D. as may be desired to secure the desired uniform wear distribution on the facings. While the overlapping lugs 21c for spring deflection in cushioning are disclosed as extending from the I. D. part way to the O. D., it is obvious I may reverse the arrangement and have them extend from the O. D. part way to the I. D. if the facings do not otherwise show enough wear at the O. D. In either event, it is understood that a portion of the radial extent of the adjoining edge portions of neighboring segments is not used for cushioning action, and I propose to interlock the edge portions of neighboring segments by means of lugs 34 formed on this remainder of the radial dimension of these adjoining edge portions, the lug 34 on one edge portion being offset one way relative to its companion lug 21c, and the lug 34 on the other edge portion being offset the other way relative to its companion lug 21c, both in parallelism to the planes of the segments, and the lugs 34 being overlapped so as to tie the segments together, so that when the clutch is disengaged it behaves substantially the same so far as true-running characteristics are concerned as a plate whose facing-carrying portion is of one-piece ring construction instead of the multi-piece mush construction shown. The overlapping tie lugs 34 are spaced radially from the other overlapping edge portions 21c by circumferentially extending slots 35, so that there is no difficulty in bending the metal at the corners of the segments on radial lines 36 to offset the lugs 34 one way and the other to the extent necessary.

It is believed the foregoing description conveys a good understanding of the objects and advantages of my invention. The appended claims have been drawn to cover all legitimate modifications and adaptations.

I claim:

1. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material of appreciable width measured radially of the plate mounted on the outer sides of the two series of cushion plate sections in substantially parallel relationship thereto, and means in circumferentially spaced relation to each pair of overlapping edge portions spacing the cushion plate sections of at least one series inwardly from the ring of friction facing material mounted thereon, the width of overlap of the edge portions of the cushion plate sections measured circumferentially of the friction facing material being small enough so that only simple or springboard-like flexure of the overlapping portions can occur in the compacting of the cushion plate sections, the length of overlap of the edge portions of the cushion plate sections measured radially from one of the inner and outer diameters of the ring of friction facing material being a fraction of the radial width of said ring, so as to concentrate the clutch engaging pressure in a predetermined portion of the radial width of the friction facing material.

2. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be fixed toward one another to a more compact relationship and having adjoining lateral edge portions disposed in overlapping relation so as to be flexed to resist compacting of the two series of cushion plate sections, pads of friction facing material of appreciable width measured radially of the plate mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the width of overlap of the edge portions of the cushion plate sections measured circumferentially of the friction facing material being small enough so that only simple or springboard-like flexure of the overlapping portions can occur in the compacting of the cushion plate sections, the length of overlap of the edge portions of the cushion plate sections measured radially from one of the inner and outer diameters of the pads of friction facing material being a fraction of the radial width of said pads, so as to concentrate the clutch engaging pressure in a predetermined portion of the radial width of the friction facing material.

3. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material of appreciable width measured radially of the plate mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the cushion plate sections being generally keystone-shaped and having their widest portions radially outermost, the lateral edge portions of neighboring cushion plate sections overlapping with increasing width radially outwardly to concentrate increased cushion pressure toward the outer diameter of the friction facings, the radially inner end portions of said cushion plate sections being cut away in an area of appreciable dimensions measured radially and transversely so as to leave two narrow and easily flexible substantially radial leg portions on the lateral edges of each plate section for support thereof on the hub member.

4. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material of appreciable width measured radially of the plate mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the cushion plate sections being of gradually increasing width radially outwardly to a given radius and substantially of a uniform width radially outwardly from that point, the lateral edge portions of neighboring cushion plate sections overlapping in diamond-shaped areas to concentrate the most cushioning pressure at the radius of the friction facings corresponding with the greatest width of said diamond-shaped areas.

5. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material of appreciable width measured radially of the plate mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the cushion plate sections being of gradually increasing width radially outwardly to a given radius and substantially of a uniform width radially outwardly from that point, the lateral edge portions of neighboring cushion plate sections overlapping in diamond-shaped areas to concentrate the most cushioning pressure at the radius of the friction facings corresponding with the greatest width of said diamond-shaped areas, the cushion plate sections of at least one series being crimped transversely of their radially inner end portions so as to bias the radially outer end portions thereof toward close contact at their lateral edges with the radially outer end portions of the cushion plate sections of the other series.

6. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material of appreciable width measured radially of the plate mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the cushion plate sections being of gradually increasing width radially outwardly to a given radius and substantially of a uniform width radially outwardly from that point, the lateral edge portions of neighboring cushion plate sections overlapping in diamond-shaped areas to concentrate the most cushioning pressure at the radius of the friction facings corresponding with the greatest width of said diamond-shaped areas, the radially inner end portions of said cushion plate sections being cut away in an area of appreciable dimensions measured radially and transversely so as to leave two narrow and easily flexible substantially radial leg portions on the lateral edges of each plate section for support thereof on the hub member.

7. A friction clutch plate comprising a central mounting means, a pair of axially spaced annular friction facings of appreciable width measured radially of the plate disposed radially outward from the periphery of said mounting means, means for connecting one of said friction facings in torque transmitting relation to said mounting means and including a series of circumferentially spaced, individual spring sheet metal friction-facing supports carried by said mounting means and extending in a generally radial direction and of equal radial length and attached to one friction facing only, each of said supports having a normally flat circumferentially extending outer end portion disposed between said facings and secured intermediate the ends thereof to its associated facing, which outer end portion has integral flexible end regions normally spaced from the two facings, other friction facing supports carried by said mounting means and extending in a generally radial direction and of the same radial length as the first mentioned supports but attached only to the other friction facing and disposed in circumferentially spaced relation so as to be located between the first mentioned supports, said other friction facing supports also having normally flat circumferentially extending outer end portions disposed between said facings and each secured intermediate the ends thereof to the associated facing, which outer end portions have integral flexible end regions disposed in overlapping relation to the flexible end regions of the first-mentioned friction facing supports and normally spaced from the two facings mutually to effect flexing of the end regions yieldingly to resist axial movement of one friction facing toward the other under clutch packing pressure, and means in circumferentially spaced relation to each pair of overlapping edge portions spacing the cushion plate sections of each series inwardly from the ring of friction facing material mounted thereon, the width of overlap of the edge portions of the friction facing supports measured circumferentially of the friction facing material being small enough so that only simple or springboard-like flexure of the overlapping portions can occur in the compacting of the friction facing supports, the length of overlap of the end regions measured radially from one of the inner and outer diameters of the facings being a fraction of the radial width of the facings, so as to concentrate the clutch engaging pressure in a predetermined portion of the radial width of the friction facings.

8. A friction clutch plate comprising a central mounting means, a pair of axially spaced annular friction facings of appreciable width measured radially of the plate disposed radially outward from the periphery of said mounting means, means for connecting one of said friction facings in torque transmitting relation to said mounting means and including a series of circumferentially spaced, individual spring sheet metal friction-facing supports carried by said mounting means and extending in a generally radial direction and of equal radial length and attached to one friction facing only, each of said supports having a normally flat circumferentially extending outer end portion disposed between said facings and secured intermediate the ends thereof to its associated facing in a fixed spaced relation thereto, which outer end portion has integral flexible end regions normally spaced from the two facings, other friction facing supports carried by said mounting means and extending in a generally radial direction and of the same radial length as the first mentioned supports but attached only to the other friction facing and disposed in circumferentially spaced relation so as to be located between the first-mentioned supports, said other friction facing supports also having flat circumferentially extending outer end portions disposed between said facings, which outer end portions have integral end regions disposed in overlapping relation to the flexible end regions of the first-mentioned friction facing supports to effect flexing of the first-named end regions yieldingly to resist axial movement of one friction facing toward the other under clutch packing pressure, the width of overlap of the edge portions of the friction facing supports measured circumferentially of the friction facing material being small enough so that only simple or springboard-like flexure of the overlapping portions can occur in the compacting of the friction facing supports, the length of overlap of the end regions measured radially from one of the inner and outer diameters of the facings being a fraction of the radial width of the facings, so as to concentrate the clutch engaging pressure in a predetermined portion of the radial width of the friction facings.

9. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material mounted on the outer sides of the two series of cushion plate sections in substantially parallel relationship thereto, and means in circumferentially spaced relation to each pair of overlapping edge portions spacing the cushion plate sections of at least one series inwardly from the ring of friction facing material mounted thereon, the length of overlap of the edge portions of the cushion plate sections measured radially from one of the inner and outer diameters of the ring of friction facing material being a fraction of the radial width of said ring, for the purpose mentioned, there being other edge portions of the cushion plate sections spaced radially with respect to and overlapped in the reverse order from the first-named edge portions to hold the latter in close contact when the clutch plate is in disengaged relation to the rest of the clutch.

10. In a friction clutch plate, a hub member, two parallel series of flexible resilient cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, pads of friction facing material mounted on the outer sides of the two series of cushion plate sections, and means in circumferentially spaced relation to each pair of overlapping edge portions for spacing said pads outwardly from said cushion plate sections to predetermine the ultimate extent of flexure of the overlapping edge portions of said cushion plate sections and accordingly predetermine the extent of cushioning action obtainable, the length of overlap of the edge portions of the cushion plate sections measured radially from one of the inner and outer diameters of the pads of friction facing material being a fraction of the radial width of said pads, for the purpose mentioned, there being other edge portions of the cushion plate sections spaced radially with respect to and overlapped in the reverse order from the first-named edge portions to hold the latter in close contact when the clutch plate is in disengaged relation to the rest of the clutch.

11. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual spring sheet metal friction-facing supports carried by said mounting means and extending in a generally radial direction and of equal radial length and attached to one friction facing only, each of said supports having a normally flat circumferentially extending outer end portion disposed between said facings and secured intermediate the ends thereof to its associated facing, which outer end portion has integral flexible end regions normally spaced from the two facings, other friction facing supports carried by said mounting means and extending in a generally radial direction and of the same radial length as the first-mentioned supports but attached only to the other friction facing and disposed in circumferentially spaced relation so as to be located between the first mentioned supports, said other friction facing supports also having normally flat circumferentially extending outer end portions disposed between said facings and each secured intermediate the ends thereof to the associated facing, which outer end portions have integral flexible end regions disposed in overlapping relation to the flexible end regions of the first-mentioned friction facing supports and normally spaced from the two facings mutually to effect flexing of the end regions yieldingly to resist axial movement of one friction facing toward the other under clutch packing pressure, and means in circumferentially spaced relation to each pair of overlapping edge portions spacing the cushion plate sections of each series inwardly from the ring of friction facing material mounted thereon, the length of overlap of the end regions measured radially from one of the inner and outer diameters of the facings being a fraction of the radial width of the facings, for the purpose mentioned, there being other portions of said end regions spaced radially with respect to and overlapped in the opposite way from the first-named portions to hold the latter in close contact when the clutch plate is in disengaged relation to the rest of the clutch.

12. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual spring sheet metal friction-facing supports carried by said mounting means and extending in a generally radial direction and of equal radial length and attached to one friction facing only, each of said supports having a normally flat circumferentially extending outer end portion disposed between said facings and secured intermediate the ends thereof to its associated facing in a fixed spaced relation thereto, which outer end portion has integral flexible end regions normally spaced from the two facings, other friction facing supports carried by said mounting means and extending in a generally radial direction and of the same radial length as the first-mentioned supports but attached only to the other friction facing and disposed in circumferentially spaced relation so as to be located between the first-mentioned supports, said other friction facing supports also having flat circumferentially extending outer end portions disposed between said facings, which outer end portions have integral end regions disposed in overlapping relation to the flexible end regions of the first-mentioned friction facing supports to effect flexing of the first-named end regions yieldingly to resist axial movement of one friction facing toward the other under clutch packing pressure, the length of overlap of the end regions measured radially from one of the inner and outer diameters of the facings being a fraction of the radial width of the facings, for the purpose mentioned, there being other portions of said end regions spaced radially with respect to and overlapped in the opposite way from the first-named portions to hold the latter in close contact when the clutch plate is in disengaged relation to the rest of the clutch.

13. A friction clutch plate as set forth in claim 1, wherein the radially inner ends of the two series of cushion plate sections are secured to the hub member, the cushion plate sections of one series being crimped transversely of their radially inner end portions so as to bias the radially outer end portions thereof toward close contact at their lateral edges with the radially outer end portions of the cushion plate sections of the other series.

14. A friction clutch plate as set forth in claim 1, wherein the radially inner ends of the two series of cushion plate sections are secured to the hub member, the cushion plate sections of both series being crimped transversely of their radially inner end portions so as to bias the radially outer end portions in opposite directions toward one another for close contact of their lateral edge portions.

15. A friction clutch plate as set forth in claim 2, wherein the radially inner ends of the two series of cushion plate sections are secured to the hub member, the cushion plate sections of one series being crimped transversely of their radially inner end portions so as to bias the radially outer end portions thereof toward close contact at their lateral edges with the radially outer end portions of the cushion plate sections of the other series.

16. A friction clutch plate as set forth in claim 2, wherein the radially inner ends of the two series of cushion plate sections are secured to the hub member, the cushion plate sections of both series being crimped transversely of their radially inner end portions so as to bias the radially outer end portions in opposite directions toward one another for close contact of their lateral edge portions.

17. A friction clutch plate as set forth in claim 3, wherein the narrow legs of the cushion plate sections of at least one series are crimped transversely so as to bias the radially outer end portions of said cushion plate sections toward close contact at their lateral edge portions with the radially outer end portions of the cushion plate sections of the other series.

18. A friction clutch plate as set forth in claim 6, wherein the narrow legs of the cushion plate sections of at least one series are crimped transversely so as to bias the radially outer end portions of said cushion plate sections toward close contact at their later edge portions with the radially outer end portions of the cushion plate sections of the other series.

W. VINCENT THELANDER.

References Cited in the file of this patent

UNITED STATES PATENTS

| Number | Name | Date |
|---|---|---|
| 2,283,113 | Wemp | May 12, 1942 |
| 2,333,308 | Goodwin | Nov. 2, 1943 |
| 2,337,135 | Thelander | Dec. 21, 1943 |
| 2,339,430 | Saks | Jan. 18, 1944 |
| 2,524,146 | Thelander | Oct. 3, 1950 |
| 2,524,147 | Thelander | Oct. 3, 1950 |